US006394767B1

(12) United States Patent
Matsumoto

(10) Patent No.: US 6,394,767 B1
(45) Date of Patent: May 28, 2002

(54) BLOWER AND A MANUFACTURING METHOD OF THE SAME

(75) Inventor: Kaoru Matsumoto, Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 18 days.

(21) Appl. No.: 09/628,312

(22) Filed: Jul. 28, 2000

(30) Foreign Application Priority Data

Feb. 29, 2000 (JP) ....................................... 2000-053645

(51) Int. Cl.[7] .......................... F04B 17/00; H02K 11/00
(52) U.S. Cl. ....................................... 417/423.1; 310/71
(58) Field of Search ......................... 417/423.1; 310/71; 425/116, 542

(56) References Cited

U.S. PATENT DOCUMENTS 5,350,960 A * 9/1994 Kiri et al. .................... 310/194
5,460,503 A * 10/1995 Kitajima et al. ............ 425/116
6,023,113 A * 2/2000 Otsuka ...................... 310/67 R
6,196,802 B1 * 3/2001 Matsumoto ............. 416/229 R
6,278,207 B1 * 8/2001 Matsumoto .................. 310/88

FOREIGN PATENT DOCUMENTS

WO WO 97/08805 * 3/1997

* cited by examiner

*Primary Examiner*—Charles G. Freay
*Assistant Examiner*—Michael K. Gray
(74) *Attorney, Agent, or Firm*—Oliff & Berridge, PLC

(57) ABSTRACT

The terminal 25 is projected outward and the injection molding is applied to the stator assembly 20 to obtain the stator assembly 24 finished with the first injection molding, subsequently the board holding stator assembly 39 is obtained by soldering the PC board 24 to the terminal 25 and the PC board 24 is injection-molded. Since the injection molding is employed, the number of process of which is smaller than comparing with the casting molding, the improvement of the productivity and the manufacturing cost are intended. The variation of the thickness of the resin between the stator and the PC board being apt to be generated in the conventional art is not invited, in its turn, the deformation, breakage of the PC board and the snapping of wire of the electronic circuit which may be generated due to the variation are not generated.

8 Claims, 3 Drawing Sheets

BLOWER AND A MANUFACTURING METHOD OF THE SAME

BACKGROUND OF THE INVENTION

1. Field of the Invention

The present invention relates to a blower and the manufacturing method of the same, which is used for a variety of office automation appliances (hereinafter referred to as "OA appliances").

2. Conventional Art

Conventionally, in the most OA appliances, many electronic parts are accommodated in a casing, so, the electronic parts are threatened to be damaged due to a heat generated from the electronic parts and accumulated in the casing. And, in general, a ventilation hole is provided in a side wall of the casing and where a blower is installed to discharge the heat accumulated in the casing outside in order to avoid the above problems.

As an example of such blower, there is one such as shown in FIG. 4.

In FIG. 4, a casing 1 forms a cylindrical venturi portion 2 (casing 1). Inside the venturi portion 2, there is an inclined surface at a small inclination angle to form an annular projection (throttle portion).

A motor base 3 is molded integrally at a central portion of one end side (lower in FIG. 4) of the venturi portion 2 (casing 1).

The motor base 8 is formed in general from an annular base body 4, a cylindrical bearing box portion 5 provided in hanging from a hole forming portion of the base body 4 and a base flange 6 formed in bending in the same direction with the bearing box portion 5 on a periphery edge portion of the base body 4.

An annular floor 7 (hereinafter referred to as "central floor") is formed inside the bearing box portion 5 and partitions the bearing box portion into two chambers (hereinafter referred to as "the first chamber at upper in FIG. 4 and the second chamber at lower in FIG. 4": signs are omitted).

Bearings (hereinafter referred to suitably as the first, the second bearings 10, 11) are coupled with the bearing box portion 5 in such a manner as they are disposed respectively in the first and second chambers, which support rotatably a shaft (rotor shaft) 12 inserted through a hole (sign is omitted) of the central floor 7 at two positions.

On one end (FIG. 4, lower) of the rotor shaft 12 a stopping ring 13 for preventing the shaft from being pulled out is installed. On the other end (FIG. 4, upper) of the rotor shaft 12, knurling 14 are engraved. A cup-shaped yoke (motor yoke) 15 is held by insert-molding at the portion provided with knurling 14. An impeller 16 is coupled with the motor yoke 15. An impeller 16 is formed cylindrical and comprises an impeller body 17 to be coupled with the motor yoke 15 and a plurality of blades 18 held on the periphery of the impeller body 17.

And, a ring-shaped magnet 19 is fixed on an inner circumferential side of the motor yoke 15, with an adhesive. A stator assembly 20 is fixed outside of the bearing box portion 5. The stator assembly 20 is in general formed of a stator core 21, a coil 22 wound around the stator core 21 and an insulating body 28 interposed between the stator 21 and the coil 22. A printed circuit board (hereinafter referred to as "PC board") 24 is disposed at one end side (FIG. 4, lower) of the stator assembly 20.

The PC board 24 comprises an electronic circuit (not shown) connected to the coil 22 through a terminal 25 provided on the coil 22. This electronic circuit is adapted to control for rotation of the magnet 19 that is the impeller 16 for rotation by carrying out a current control to the coil 22 due to an electro-magnetic force between the coil 22 and the magnet 19[that is, a rotor consisting of the magnet 19, the motor yoke 15 and the stator assembly 20 (not shown) function as a brushless motor]. Further, the terminal 25 and the PC board 24 are connected by soldering.

In FIG. 4, 26 designates a lead to supply an electric power to the coil 22 through an electronic circuit.

The blower structure mentioned above is adapted to fix the PC board 24 to the stator assembly 20 by soldering the terminal 25 of the coil 22 consisting of the stator assembly 20 to the electronic circuit of PC board 24.

And the substance 30 (for convenience' sake, called as a board fixing stator assembly) obtained by fixing PC board 24 to the stator assembly 20 is applied with a resin molding 31 by casting type and the obtained one (hereinafter for convenience' sake, referred to as a resin molded board fixed stator assembly) 32 is adapted to be adhered and fixed to the bearing box portion 5.

In the blower structured above, a blow in an axial direction is generated by the rotation of the blades 18 of the impeller 16 in the venturi portion 2, and the inside of the casing of the OA appliances is cooled by this blow and a damage of electronic parts installed in the OA appliances due to the heat generated is prevented.

Now, it has been desired to increase the productivity of a blower and to lower the manufacturing cost. However, in the above mentioned prior art, the board fixing stator assembly 80 is prepared by applying a resin molding with a casting type is applied, which includes many processes such as a resin casting process, a vacuum treatment process for evacuating air and a heat treatment process for accelerating hardening, and thereby, the productivity has been lowered and to that extent a higher manufacturing cost is invited.

For reference, it is considered to use an injection molding as a means enabling to reduce the number of process comparing with the casting type. However, when employing the injection molding in place of the casting type for the board fixing stator assembly 30, a resin (resin molding 31) thickness of the resin between the stator assembly 20 and the PC board 24 varies enormously, thereby, the PC board 24 is apt to be deformed, damaged and threatened to generate a wire cutting of the electronic circuit due to a sink of the resin (resin molding 31). So that, even if the injection molding is employed, actually the above requirement (for productivity increasing and cost lowering) has not been appropriately responded.

The present invention has been made in the light of the above circumstance to provide a blower which enables to realize an increasing of productivity and lowering of the manufacturing cost without inviting a deformation and a damage, and a manufacturing method thereof.

According to a first aspect of the present invention, in a blower which comprisises a bearing box formed for housing a bearing in the center portion of a cylindrical casing, a rotor held on a shaft supported rotatably on the bearing, a stator consisting of a stator core and a coil and being held on the periphery of the bearing box, a ring-shaped magnet provided on the rotor spaced from the stator at a given gap and a PC board connected to an extracting terminal of the coil, and having an electronic circuit for carrying out a current controlling for the coil, the blower is characterized in that the. extracting terminal is projected out and connected electrically to the PC board to which the stator is injection-molded with a resin and the whole of the PC board is molded with a casting molding.

According to a second aspect of the present invention, in the constitution of the first aspect, the resin molding of the whole PC board is carried out by an injection molding.

According to a third aspect of the present invention, in the constitution of the second aspect, the whole of the PC board is coated or impregnated with a resin and the whole is injection-molded.

According to a fourth aspect of the present invention, in the constitution of the first aspect of the present invention, the molding of the whole of the PC board is carried out with the casting type molding.

According to a fifth aspect of the present invention, in a manufacturing method of a blower in which, a bearing box for housing a bearing in the center portion of a cylindrical casing is formed, a rotor is held on a shaft supported rotatably on the bearing, a stator consisting of a stator core and a coil is held on the periphery of the bearing box, a ring-shaped magnet is provided on the rotor by being spaced at a given gap from the stator and a PC board having an electronic circuit for carrying out a current controlling for the coil is connected to a terminal for extracting coil. the extracting terminal is projected out and the stator is injection-molded with a resin and to the extracted terminal the PC board is connected electrically and the whole of the PC board is molded with a resin.

According to a sixth aspect of the present invention, in the constitution of the fifth aspect, the molding with a resin of the whole of the PC board is carried out by the injection molding.

According to a seventh aspect of the present invention, in sixth aspect after a resin is coated on the whole of the PC board or it is impregnated with a resin, the molding of the whole of the PC board is carried out by the injection molding with a resin.

According to an eighth aspect of the present invention, in the constitution of the fifth aspect of the present invention, the molding of the whole of the PC board is carried out by a casting molding.

EMBODIMENT

Hereinafter, an embodiment of the blower of the present invention is explained referring to FIG. 1. The blower of this embodiment is used for cooling an office automation (OA) appliances, and is adapted to be used in particular in a severe environment. For reference, this blower is not necessarily limited to be used only in a severe environment but also may be used in a comparatively moderate environment.

Figure 1:
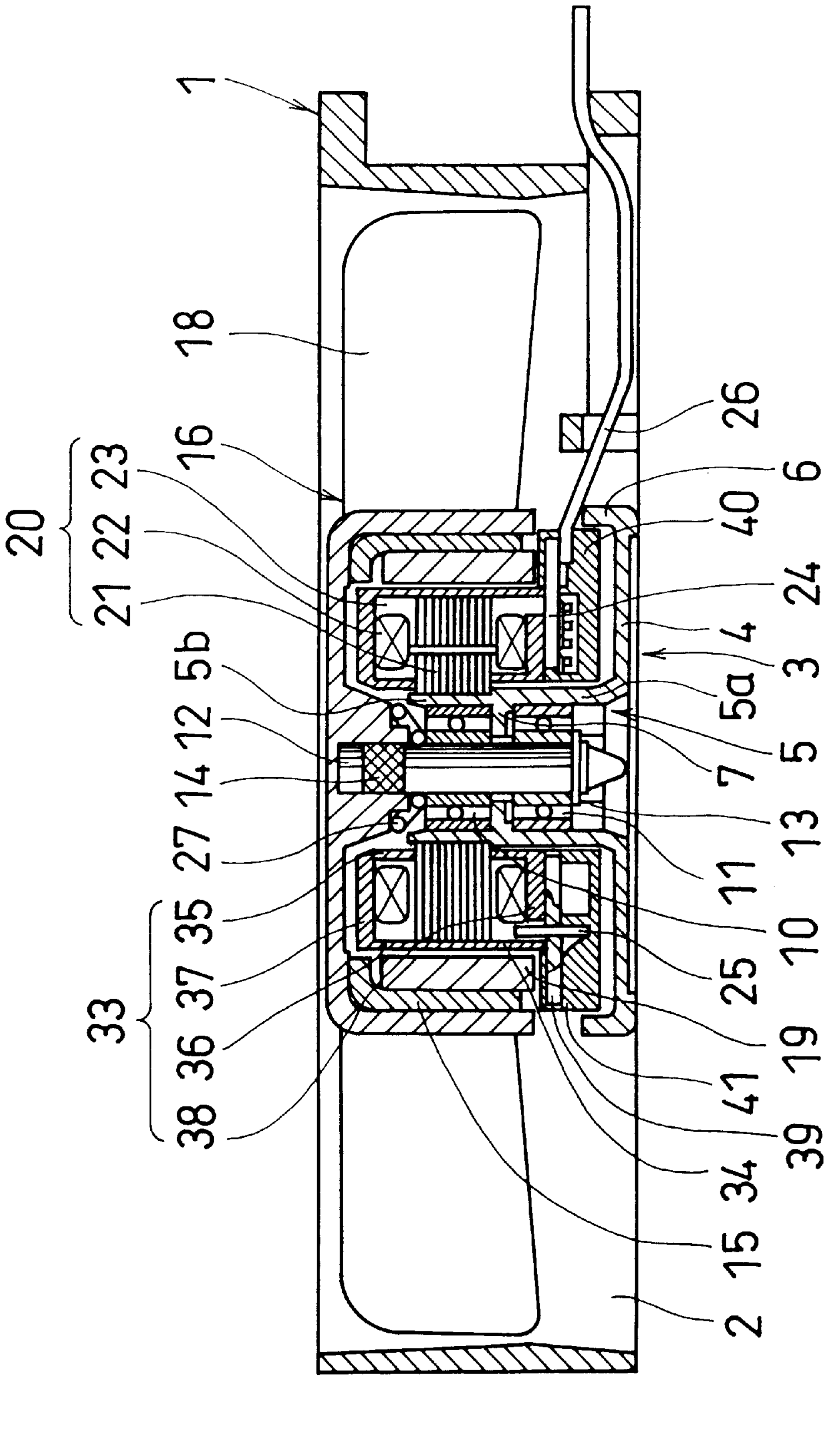
FIG. 1 is a sectional view showing an embodiment of the blower of the present invention.

In FIG. 1, a casing 1 forms a cylindrical venturi portion 2. Inside the venturi portion 2, an inclined surface of a mild inclination angle is provided in such a manner as it forms an annular projection (throttle portion).

At one end side (FIG. 1 lower) of the venturi portion 2 (casing 1) and in a central portion, a motor base 3 is molded integrally The motor base 8 is formed in general with an annular base body 4, a cylindrical bearing box 5 suspended-in a hole forming portion of the base body 4, a base flange 6 formed by bending in the same direction of the bearing box 5 at the edge of the periphery of the base body 4.

Figure 4:
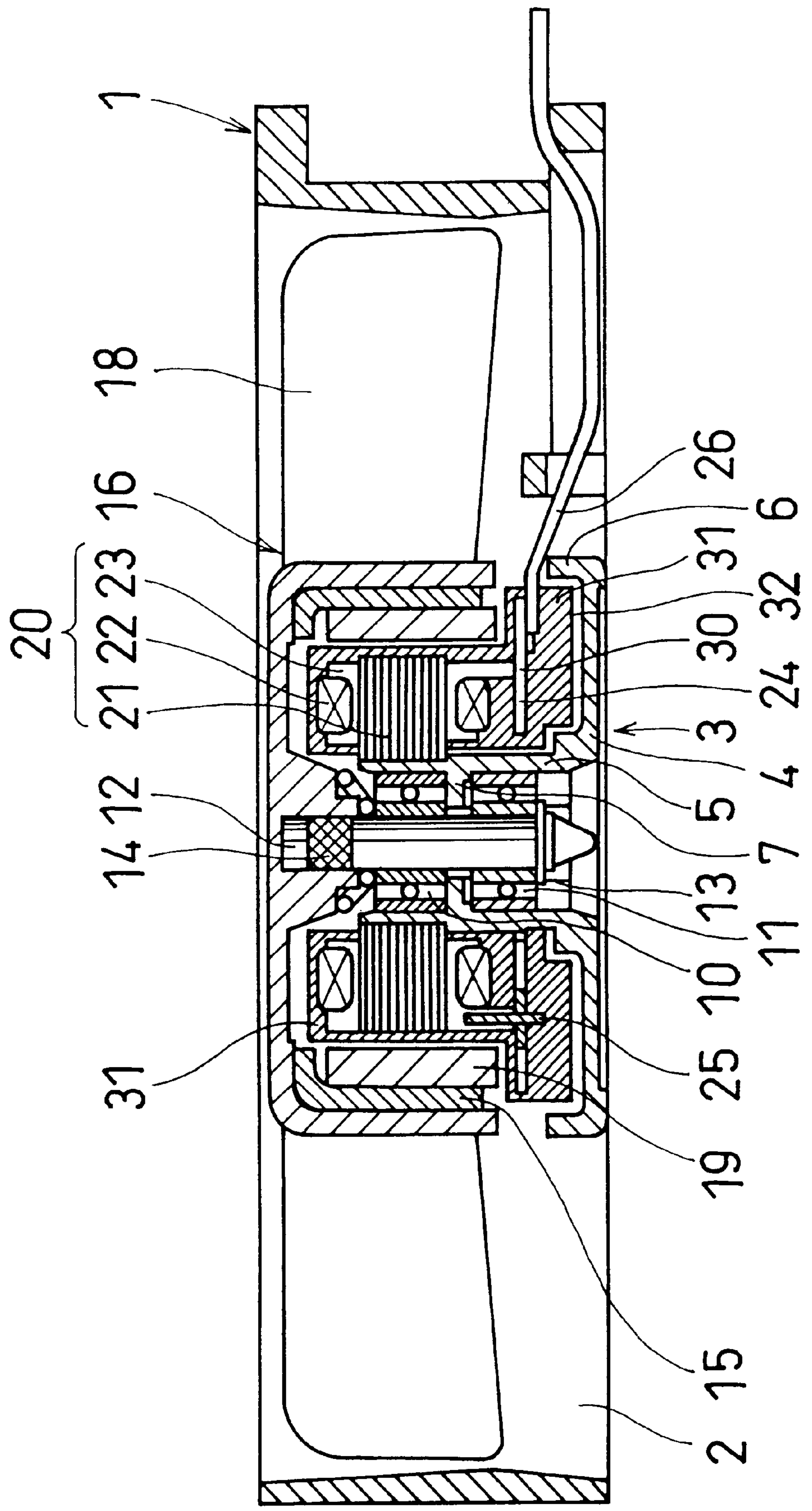
FIG. 4 (Prior Art)
FIG. 4 is a sectional view of an example of a conventional blower.

Inside the bearing box 5, an annular floor (called as a center floor) 7 is formed, the inside of the bearing box 5 is defined into two chambers (a chamber at upper in FIG. 4, is called the first chamber, a chamber at lower is the second chamber) (sign is omitted). In the bearing box 5, the bearings (hereinafter, for convenience, referred to as the first and second bearing 10 and 11) are coupled in such a manner as those are disposed in the first chamber and the second chamber respectively, and support rotatably a shaft (a rotor) 12 inserted through the hole (not shown) of the central floor 7 at two portions.

A tip end side portion **5*b* of the bearing box 5 is set to be thinner in a wall thickness comparing with a proximal side portion 5*a* located under the central floor 7 of the bearing box 5, thereby a stepped portion (not shown) is formed on the periphery side of the bearing box 5**.

At one end (lower in FIG. 1) of the rotor shaft 12, a stopper ring 13 for preventing the rotor shaft from being pulled out is provided.

At the other end (upper in FIG. 1) of the rotor 12, a knurling 14 is engraved. At the portion of the rotor 12 to be applied with a knurling 14, a cup-shaped yoke (motor yoke) 15 is held by being insert-molded. To the motor yoke 15 an impeller 16 is inserted. The impeller 16 is configured cylindrical and comprises an impeller body 17 to couple with the yoke 15 and a plurality pieces of blades 18.

On an inner circumferential side of the motor yoke 15, a ring-shaped magnet 19 is fixed by adhering.

On an outer side of the bearing box 5, the stator assembly 20 is fixed by adhering. The stator assembly 20 is formed in general with a stator core 21, a coil 22 wound around the stator core 21 and an insulator 28 interposed between the stator core 21 and the coil 22. At one end (lower in FIG. 1) of the stator assembly 20, a PC board 24 is disposed.

The PC board 24 comprises an electronic circuit (not shown) connected to the coil 22 through a terminal 25 (extraction terminal) provided on the coil 22, to that electronic circuit is adapted to include not shown electronic parts to be mounted on the PC board 24. This electronic circuit is adapted to control the current to the coil 22 and make the magnet 19 that is the impeller 16 rotated and controlled by an electromagnetic force between the coil 22 and the magnet 19 (that is, the rotor consisting of such as the magnet 19 and the motor yoke 15 and stator assembly 20 (stator) are adapted to function as a brushless motor). The terminal 25 and the PC board 24 are connected by soldering.

In FIG. 1, a sign 26 designates a lead for supplying an electric power to the coil 22 through the electronic circuit and a sign 27 designates a coil spring for making a thrust load to the first bearing 10.

Hereinafter, a manufacturing method of the blower thus constituted in general is explained.

First, the stator assembly 20 is obtained by winding a coil 22 around the stator core 21 through the insulation body 23.

Figure 2:
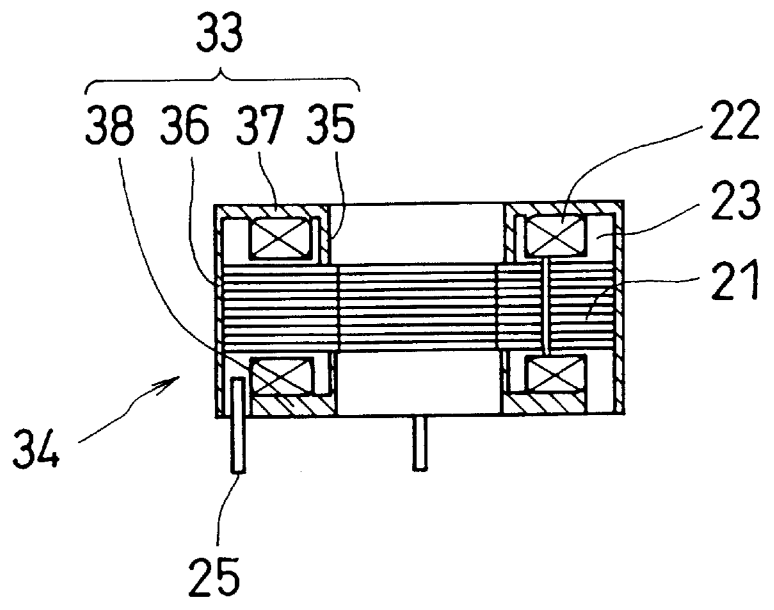
FIG. 2 is a sectional view showing the process to obtain the primary injection molded stator assembly of FIG. 1.

Next, an injection molding is applied to the stator assembly 20 while the terminal 25 being projected out, and as shown in FIG. 2, a covering body 83 made of a resin, having a hollow portion (not shown) covering approximately the stator assembly 20 (it does not cover the inner circumferential surface portion of the stator core 21) is formed to constitute a stator assembly 34 finished with a first injection molding with the stator assembly 20 and the resin covering body 33.

The resin covering body 33 is formed in general from an inner wall portion 35 to be adhered to fix to the base body 4 of the bearing box 5, an outer wall portion 36 to form a hollow portion (not shown) to house the coil 22 and so on between the inner wall portion 35, a cover portion 37 to connect the inner wall portion 35 and the outer wall portion 86 at one side (FIG. 1, upper) and a bottom portion 38 to be formed so as to be bent toward the other end side (FIG. 1, lower) of the inner wall portion 35. Between the outer wall portion 86 and the bottom portion 38, a gap (not shown) is formed, through which the terminal 25 is extended out side (FIG. 1, lower).

Next, the PC board 24 is disposed at one end of the stator assembly 34 finished with the first injection molding (FIG. 1, lower) by abutting thereto, and is soldered to the terminal 25 projected outside to obtain a board holding stator assembly 39 (FIG. 3) the PC board 24 of which is held by the stator assembly 34 finished with the first injection molding.

Figure 3:
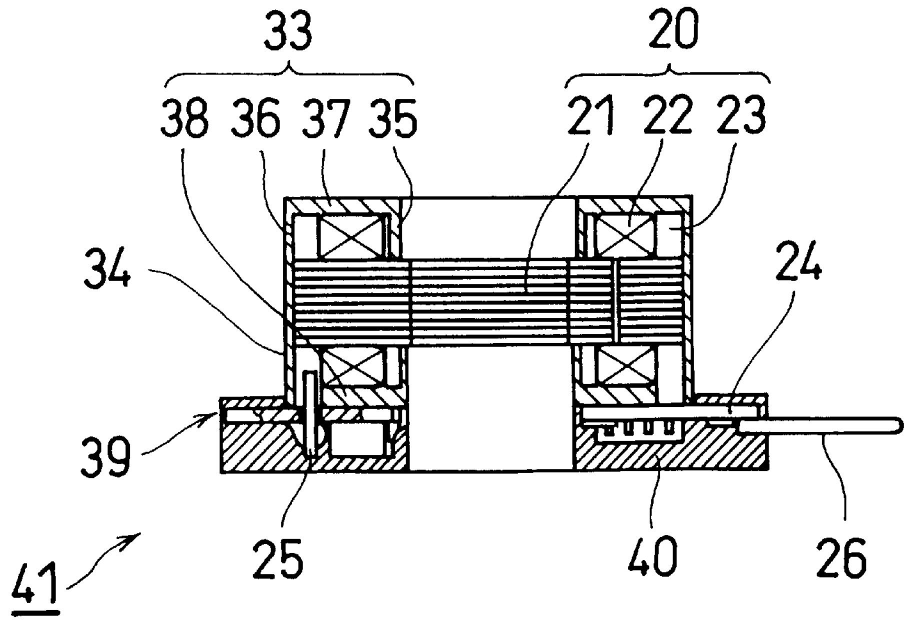
FIG. 3 is a sectional view showing a process of obtaining the secondary injection molded stator assembly of FIG. 1.

Further, an injection molding is applied to a portion (FIG. 1 lower side) holding the PC board 24 of the board holding stator assembly 39, and as shown in FIG. 3, a resin holding member 40 made of a resin is formed in such a manner as it clamps the PC board 24 with the board holding stator assembly 39, and with the board holding stator assembly 39 and the resin holding member 40 a stator assembly 41 finished with the second injection molding is formed.

And, as shown in FIG. 1, the stator assembly 41 finished with the second injection molding is coupled with the periphery of the bearing box 5 to obtain the blower.

The blower thus formed generates a wind stream in an axial direction within the venturi 2 by the rotation of the blades 18 of the impeller 16; and this wind cools the inside of the casing of an OA appliance and the damage of the electronic parts due to heat generation is prevented.

In the blower thus formed, as mentioned above, the stator assembly 34 finished with the first injection molding is obtained by applying injection molding to the stator assembly 20 while projecting the terminal 25 outward (see FIG. 2).then the board holding stator assembly 39 is obtained by soldering the PC board 24 to the terminal 25 projected outward, and next the injection molding is applied to a portion holding the PC board 24 in the board holding stator assembly 39, thereby the stator assembly 41 finished with the second injection molding, is obtained by making the holding member 40 (the resin holding member) made of a resin integrally with the board holding stator assembly 89, (FIG. 8), and this stator assembly 41 finished with the second injection molding is adapted to be coupled with the periphery of the bearing box 5.

In the above mentioned conventional art (FIG. 4), although a blower has been manufactured by using the casting type including a lot of processes such as a resin pouring, a vacuum treatment for air evacuation and a heat treatment for accelerating the resin to be hardened, in the present embodiment, a blower is manufactured by using an injection molding process having a small number of processes comparing with the casting type, thereby the number of production process can be reduced to improve the productivity. In addition, together with the improvement of the productivity a cost lowering of the blower can be realized.

Further, in the above conventional art (FIG. 4) in which an injection molding is used to the board fixing stator assembly 30, the thickness of the resin (resin molding 31) between the stator assembly 20 and the PC board 24 varies greatly, so that, there is threatened to generate a breakage by a deformation of the PC board 24 due to a sink of the resin (resin molding 31) and a snapping of a lead of the electronic circuit.

On the other hand in the embodiment of the present invention, the PC board 24 is disposed at one end side (FIG. 1 lower) of the stator assembly 84 finished with the first injection molding by abutting thereto, and the stator assembly 41 finished with the second injection molding is obtained by applying molding to the board holding stator assembly 39 formed by soldering the PC board 24 to the terminal 25.

And, as to the molding problem being caused between the stator assembly 20 and the PC board 24 in the conventional art, the molding has been already finished as a part of the resin covering body 38 in the stator assembly 41 finished with the second injection molding to be obtained a the process prior to the process where an injection molding is applied to the board holding stator assembly 39. Thereby, the deformation and breakage of the PC board 24, which can be generated due to the great variation of the thickness of the resin (resin molding 31) between the stator assembly 20 and the PC board 24 in the conventional technique (FIG. 4) using an injection molding, and the snapping of the wire of the electronic circuit provided on the PC board 24 are not generated.

And, the electronic parts are happened to be influenced by the sink of the injection molded resin to be used in the electronic circuit of the PC board 24. because there are various shapes of the electronic parts. In that case, comparatively soft kind of resin is applied to the PC board 24, or it is impregnated in advance, and subsequently due to the application of the injection molding the breakage of the electronic parts of the electronic circuit and the snapping of the wire of the electronic circuit can be avoided, In the above embodiment, although the case where an injection molding is applied to the PC board 24 on the board holding stator assembly 39 is exemplified, it is not limited to this, the casting type of molding may be applied in place of injection molding to the PC board 24 in the board holding stator assembly 39.

According to any one of the first to fourth aspects of the present invention, since the extraction terminal is projected outward, the stator is applied by the injection molding and the injection molding in which the number of the process of which can become smaller than the casting molding is employed, the productivity of the blower is improved and also intended to lower the production cost. Further, since the PC board is connected electrically to the extraction terminal after the extraction terminal is projected outward and the stator is injection-molded with a resin, whole of the PC board connected with the above extraction terminal is molded with a resin, the great generation of variation of the thickness of the resin existing between the stator and the PC board, which have been apt to occur in the conventional art in which the injection molding has been used is not invited, in its turn, a possible generation of the deformation and breakage of the PC board, and the snapping of the wire of the electronic circuit mounted on the PC board are not generated.

According to any one of the aspects from fifth to eighth, the improvement of the productivity of the blower and accordingly the cost lowering of the blower can be intended, because the stator is molded with a resin while the extraction terminal being projected outward by employing the injection molding which needs process smaller in number comparing with the casing molding.

Further, the great variation in resin thickness between the stator and the PC board which has been apt to be generated in the conventional art using an injection molding are not invited, because whole of the PC board connected electrically to the extraction terminal which is in advance projected outward while the stator is injection molded. Thereby, the deformation and breakage of the PC board and the snapping of the wire of the electronic circuit of the PC board which may be generated due to variation are not generated.

What is claimed is:

1. A blower, comprising:

a bearing box for housing a bearing formed in the center portion of a cylindrical casing;

a rotor held on a shaft supported rotatably on the bearing;

a stator comprising a stator core and a coil held on the periphery of the bearing box;

a ring-shaped magnet spaced from the stator at a given gap; and a PC board connected to an extraction terminal of the coil and provided with an electronic circuit for controlling a current to the coil, wherein the extraction terminal is protruding to the outside, the stator is injection molded by resin and thereafter the extraction terminal is electrically connected to the PC board, wherein the whole of the PC board is molded by resin.

2. A blower according to claim 1, wherein the resin molding of the whole of the PC board is carried out by the injection molding.

3. A blower according to claim 2, wherein the whole of the PC board is in advance coated with a resin or impregnated with a resin and is injection molded with a resin.

4. A blower according to claim 1, wherein the molding with a resin to the whole of the PC board is carried out by a casting molding.

5. A manufacturing method of a blower comprising:

a bearing box for housing a bearing in the center portion of a cylindrical casing is formed;

a rotor is held on a shaft supported rotatably on the bearing;

a stator comprising a stator core and a coil held on the periphery of the bearing box;

a ring-shaped magnet is provided on the rotor spaced from the stator at a given gap; and a PC board connected to an extraction terminal of the coil and provided with an electronic circuit for controlling a current to the coil, wherein the extraction terminal is protruding to the outside, the stator is injection molded by resin and thereafter the extraction terminal is electrically connected to the PC board, wherein the whole of the PC board is molded by resin.

6. A manufacturing method according to claim 5, wherein the molding with a resin of the whole of the PC board is carried out by the injection molding.

7. A manufacturing method according to claim 6, wherein, after a resin is coated on the whole of the PC board or the PC board is impregnated with a resin, the molding of the whole of the PC board is carried out by the injection molding.

8. A manufacturing method according to claim 5, wherein the molding of the whole of the PC board is carried out by a casting molding.

* * * * *

US006394767C1

(12) EX PARTE REEXAMINATION CERTIFICATE (5244th)

United States Patent

Matsumoto

(10) Number: US 6,394,767 C1

(45) Certificate Issued: Dec. 13, 2005

(54) BLOWER AND A MANUFACTURING METHOD OF THE SAME

(75) Inventor: Kaoru Matsumoto, Kitasaku-gun (JP)

(73) Assignee: Minebea Co., Ltd., Miyota-machi (JP)

Reexamination Request:
No. 90/006,602, Apr. 15, 2003

Reexamination Certificate for:

| | |
|---|---|
| Patent No.: | **6,394,767** |
| Issued: | **May 28, 2002** |
| Appl. No.: | **09/628,312** |
| Filed: | **Jul. 28, 2000** |

(30) Foreign Application Priority Data

Feb. 29, 2000 (JP) ....................................... 2000-053645

(51) Int. Cl.[7] .......................... F04B 17/00; H02K 11/00

(52) U.S. Cl. ....................... 417/423.1; 310/71; 417/354

(56) References Cited

U.S. PATENT DOCUMENTS 4,934,041 A 6/1990 Hoover et al. ................ 310/71

FOREIGN PATENT DOCUMENTS

EP 0 299 512 A2 1/1989 ................ 318/254

*Primary Examiner*—Cheryl J Tyler

(57) ABSTRACT

The terminal 25 is projected outward and the injection molding is applied to the stator assembly 20 to obtain the stator assembly 24 finished with the first injection molding, subsequently the board holding stator assembly 39 is obtained by soldering the PC board 24 to the terminal 25 and the PC board 24 is injection-molded. Since the injection molding is employed, the number of process of which is smaller than comparing with the casting molding, the improvement of the productivity and the manufacturing cost are intended. The variation of the thickness of the resin between the stator and the PC board being apt to be generated in the conventional art is not invited, in its turn, the deformation, breakage of the PC board and the snapping of wire of the electronic circuit which may be generated due to the variation are not generated.

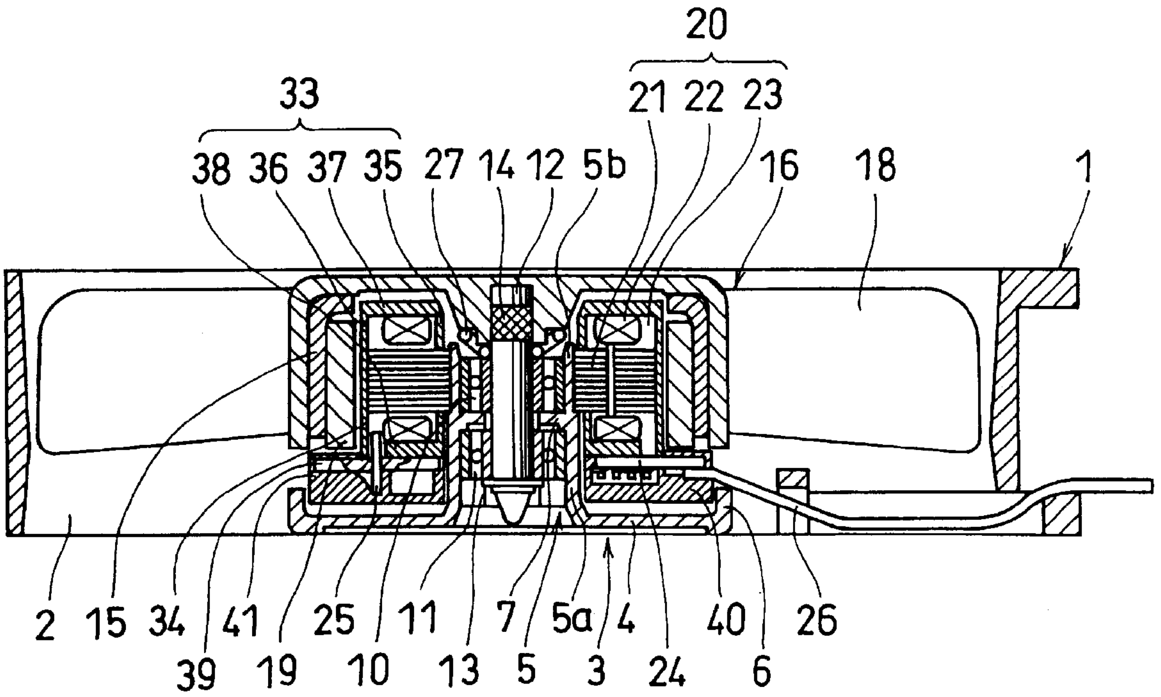

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *